United States Patent

Leitgeb

[15] 3,699,365
[45] Oct. 17, 1972

[54] ELECTRODYNAMIC LINEAR MOTOR

[72] Inventor: Wilhelm Leitgeb, Berlin, Germany

[73] Assignee: Siemens Aktiengesellschaft, Berlin, Munich, Germany

[22] Filed: Aug. 2, 1971

[21] Appl. No.: 168,111

[30] Foreign Application Priority Data

Aug. 12, 1970 Germany..........P 20 40 986.3

[52] U.S. Cl..................................310/12, 310/27
[51] Int. Cl..........................................H02k 41/02
[58] Field of Search..................310/12–14; 318/135, 121; 104/148, 148 LM

[56] References Cited

UNITED STATES PATENTS

| | | |
|---|---|---|
| 2,870,349 | 1/1959 | Rosenberg et al...........310/13 |
| 3,456,136 | 7/1969 | Pierro.........................310/12 |
| 3,575,650 | 4/1971 | Fengler......................318/135 |
| 3,577,929 | 5/1971 | Onoda et al. .......104/148 LM |
| 3,594,622 | 7/1971 | Inagaki......................318/135 |

Primary Examiner—D. F. Duggan
Attorney—Curt M. Avery et al.

[57] ABSTRACT

A synchronous electrodynamic motor comprises a primary part with a yoke which has lateral parts. The lamination stacks of the primary part carry a multiphase AC winding and are subdivided in height into portions which are surrounded by respective direct current excitation windings whose magnetic flux path is closed only through the lateral parts of the yoke.

5 Claims, 4 Drawing Figures

ELECTRODYNAMIC LINEAR MOTOR

The invention relates to an electric motor and more particularly to a synchronous electrodynamic linear motor.

Electrodynamic linear motors may be designed as synchronous or asynchronous machines. In a synchronous motor of this type, the field excitation is provided by a special excitation winding which is preferably energized by direct current.

In a preferred embodiment of such a machine, the direct current excitation winding is mounted on the inductor or primary part in addition to the multiphase AC winding which produces the travelling field. The secondary part of the linear motor has alternately positioned magnetic and non-magnetic sectors corresponding in length to the pole division of the multiphase AC winding of the inductor or primary part. Such an arrangement has the advantage that the secondary part of the linear motor is free of windings. The excitation winding is mounted on the inductor in such a way that a magnetic flux is induced transverse to the area of the air gap.

My invention is an improvement of a synchronous electrodynamic linear motor of the aforedescribed type.

It is an object of the invention to provide a synchronous electrodynamic linear motor in electromagnetic respects so as to afford a better utilization or decrease in size of such a motor for a given power demand.

Another object of the invention is to provide a synchronous electrodynamic linear motor in which the middle part of the yoke connecting the lamination stacks is free from conducting the excitation flux.

Still another object of the invention is to provide a synchronous electrodynamic linear motor in which the magnetic excitation flux crosses the air gap in two directions to produce two opposite magnetic attractions which substantially cancel each other.

A further object of the invention conjoint with those aforementioned is to provide a synchronous electrodynamic linear motor which functions with efficiency, effectiveness and reliability and produces a high torque.

In accordance with the invention, the inductor comprises lamination stacks on which the multiphase AC winding is mounted. The height of the lamination stacks is subdivided; each portion being enclosed by an excitation winding through which direct current flows in a manner whereby magnetic flux closes only through the lateral parts of the yoke. As a result, the total magnetic flux produced by the excitation winding is guided in different directions across the air gap of the electrodynamic motor in a manner whereby the middle part of the yoke connecting the lamination stacks is free from the return flow of the flux.

In order that this type of linear motor with subdivided lamination stacks may function properly, it is necessary to arrange the conductors or turns of the AC winding which produces the travelling field in the individual parts of the lamination stack, which are displaced by one pole division. Since this requires a somewhat more complicated winding design, it is recommended that rather than subdivide the conductors of the multi-phase AC winding, the magnetic sectors in the secondary part of the linear motor be subdivided with respect to their height, into component sections corresponding to the lamination sections, and that the component sections be mutually displaced by one pole division. This arrangement has the further advantage that the magnetic flux which crosses the air gap in two directions produces two opposite magnetic attractions which cancel each other during a unilateral change in air gap.

To increase the efficiency of the electrodynamic linear motor and the produced torque, it is recommended that a plurality of the motors of the invention be arranged adjacent each other with their inductors combined to form a common yoke. Only the lateral parts of the yoke are utilized for conducting the magnetic flux. The middle part of the yoke is used for fastening the parts of the lamination stack.

It is expedient to interconnect the magnetic sectors of the secondary part of the motor by non-magnetic material The magnetic sectors of the secondary part may be embedded, for example, in one or more components of concrete.

In order that the invention may be readily carried into effect, it will now be described with reference to the accompanying drawings, wherein.

In the FIGS., the same components are identified by the same reference numerals.

Figure 1:
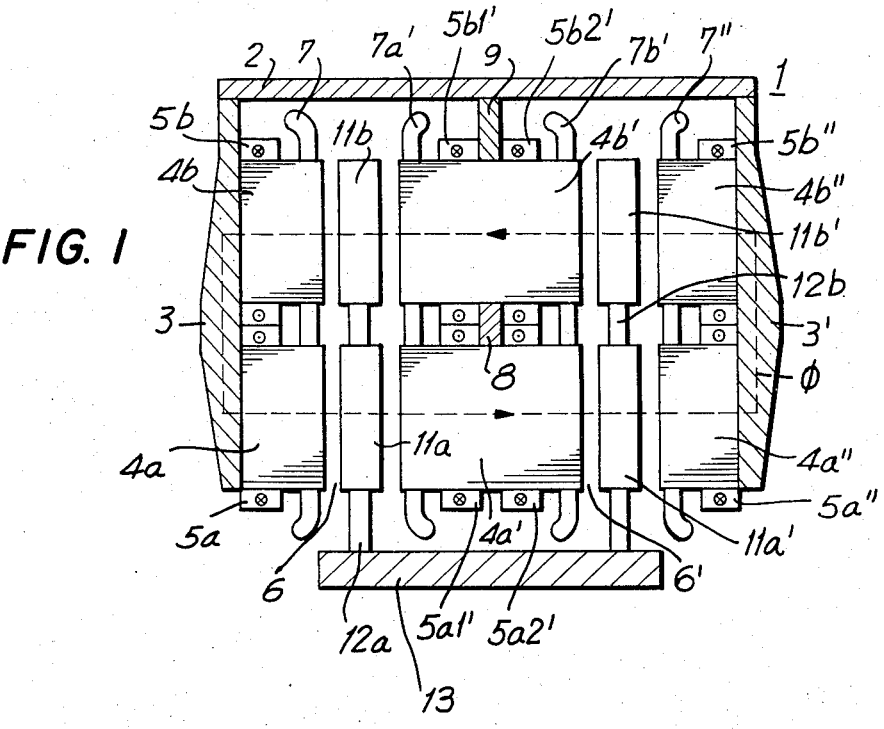
FIG. 1 is a view, partly in section, of an embodiment of the electrodynamic linear motor of the invention.

In the embodiment of FIG. 1, an electric linear motor 1 comprises two adjacent motors. The inductor or primary part of the motor comprises a common yoke 2 and lamination stacks positioned between lateral legs 3 and 3' of the yoke. The lamination stacks are divided in height into two equal parts 4a and 4b, 4a' and 4b', and 4a'' and 4b'', and are enclosed by excitation windings 5a and 5b, 5a1' and 5b1', 5a2' and 5b2', and 5a'' and 5b'', which, as previously mentioned, are traversed by direct current.

The stack portions 4a and 4b, and so on, expose two air gaps 6 and 6' whose side flanks contain, in open grooves, the conductors or turns of multiphase AC windings 7, 7a', 7b' and 7''. The laminated stack portions 4a' and 4b', situated between the air gaps 6 and 6', are interconnected by a component 8 of non-magnetic material and another component 9 of non-magnetic material, and are affixed to the center part of the yoke 2.

Figure 2:
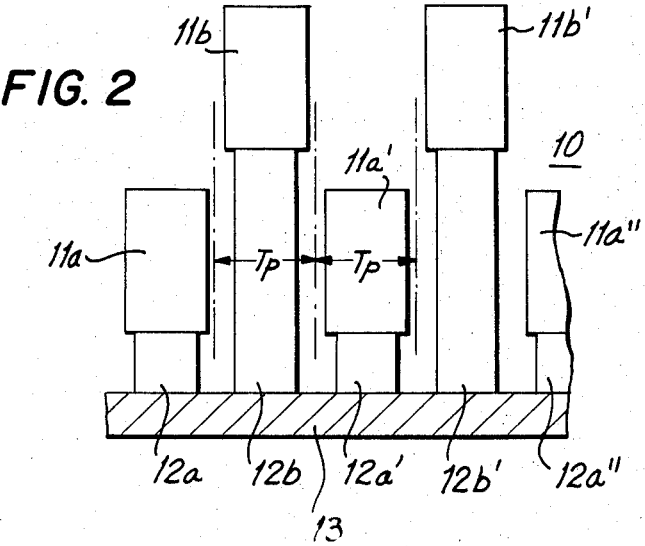
FIG. 2 is a schematic diagram of the secondary part of the motor of the embodiment of FIG. 1.

The electrodynamic linear motor 1 of the invention has a secondary part 10 (FIG. 2), which is devoid of windings and comprises magnetic and non-magnetic sectors which extend into the air gaps 6 and 6'. The lengths of the magnetic and non-magnetic sectors of the secondary part 10 correspond to the pole division $T_p$ of the multiphase AC windings 7, and so on. The magnetic sectors of the secondary part 10 comprise iron components 11a, 11b, 11a', 11b', 11a'', having heights corresponding to the heights of the stack portions 4a and 4b, 4a' and 4b' and 4a'' and 4b''. The iron components 11a, 11a' and 11a'', which correspond in height to the lower stack of laminations, are mutually displaced relative to the iron components 11b, 11b' and 11b'', which correspond in height to the upper stack of laminations, by a pole division $T_p$ in the longitudinal direction of the air gaps 6 and 6'.

The iron components 11a, and so on, are affixed to a stationary concrete component 13 which connects the secondary parts 10 of both motors via non-magnetic members 12a, 12a' and 12a''. The iron components 11b, and so on, are affixed to the concrete component 13 via non-magnetic members 12b, 12b' and 12b''. The displaced arrangement of the magnetic sectors of the secondary part 10 provided for the individual parts of the lamination stack permits the multiphase AC windings 7, and so on, to comprise winding rods arranged in a continuous groove in both laminated portions 4a and 4b, and so on.

The magnetic flux curve is shown in broken lines in FIG. 1 and is produced in the inductor of the linear motor 1, by the excitation winding through which direct current flows. It may be assumed that the magnetic flux 0 in the air gaps 6 and 6' is virtually present only in these regions where the predominant portion of the space between the lamination stacks 4a and 4b, and so on, is bridged by the iron components 11a and 11b, and so on, of the secondary part 10. Forces are therefore exerted against the movable inductor which produce a relative movement between the movable inductor and the stationary secondary part 10. These forces are in proportion to the air gap surface of the inductor, to the air gap induction and the magnetic lines of force of the multiphase AC windings 7, and so on.

Figure 3:
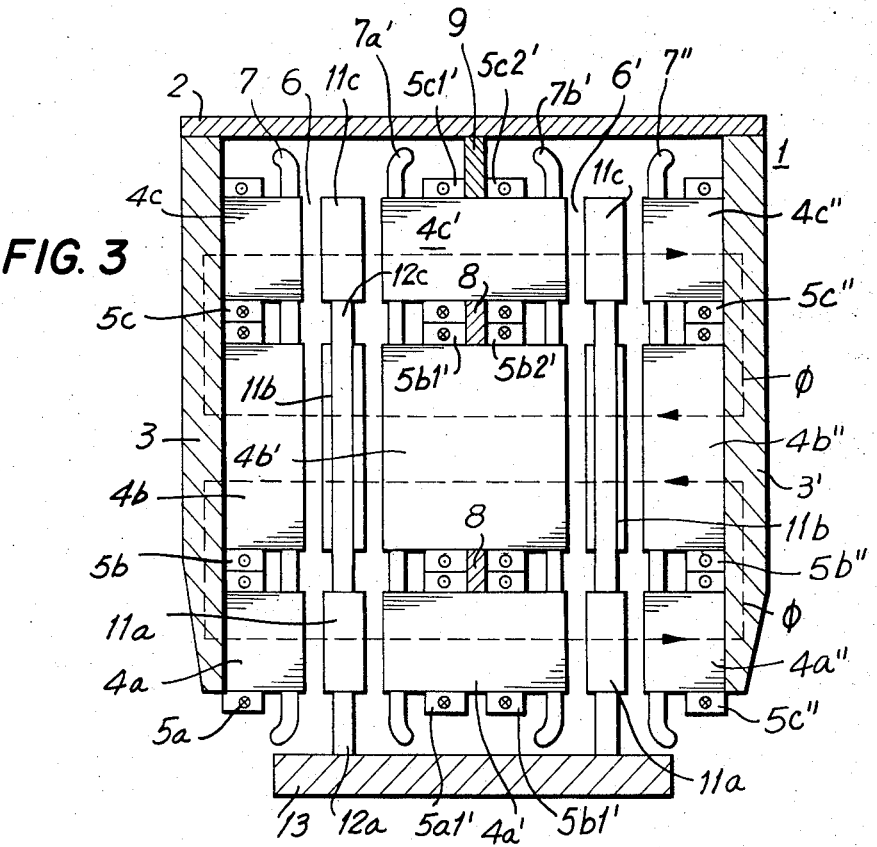
FIG. 3 is a view, partly in section, of another embodiment of the electrodynamic linear motor of the invention.
Figure 4:
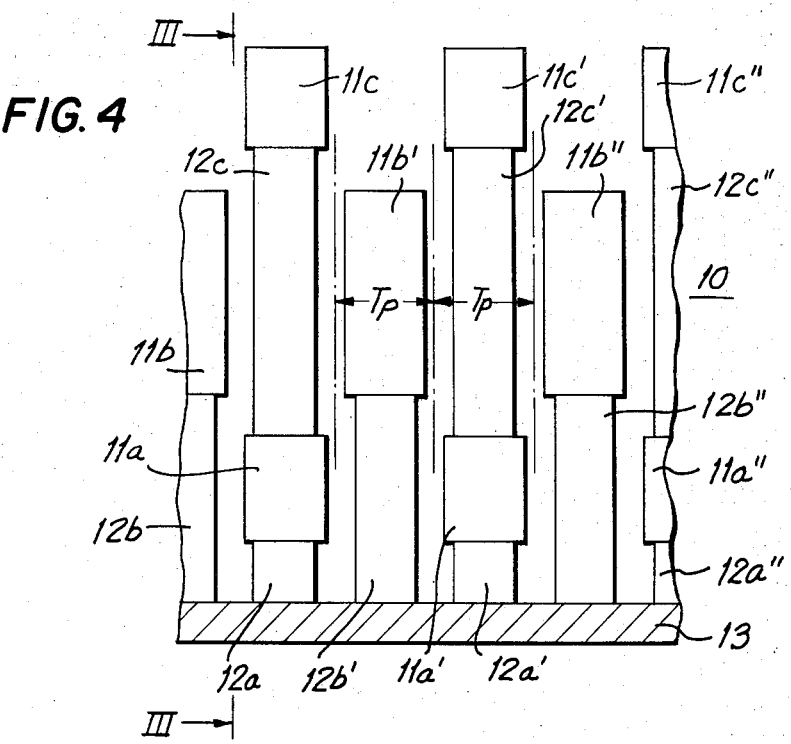
FIG. 4 is a schematic diagram of the secondary part of the motor of the embodiment of FIG. 3.

FIGS. 3 and 4 show another embodiment of the invention wherein the linear motor 1 comprises two adjacent motors and contains stacks of laminations whose height is divided into three stack parts 4a, 4b and 4c, and so on, each stack part being enclosed by an annular excitation winding 5a, 5b and 5c, and so on.

In the embodiment of FIG. 3, the conductors of the multiphase AC windings 7, 7a', 7b' and 7'' of all the lamination stacks 4a, 4b and 4c, and so on, are arranged in a continuous groove. The magnetic sectors of the secondary part 10 of the motor (as illustrated in FIG. 4) are respectively subdivided into iron components 11a, 11b and 11c, and so on, whose heights correspond to the respective parts of the lamination stacks 4a, 4b and 4c, and so on. The respective components are mutually displaced by one pole division $T_p$.

The magnetic flux 0 in the components has a curve, shown in broken lines in FIG. 3, which runs in one direction toward said components and terminates in said components in the other direction. The flow direction of the direct currents in the excitation windings 5a, 5b and 5c, and so on, is so selected that the produced magnetic flux 0 closes only through the lateral legs 3 of the yoke 2.

While the invention has been described by means of specific examples and in specific embodiments, I do not wish to be limited thereto, for obvious modifications will occur to those skilled in the art without departing from the spirit and scope of the invention.

I claim:

1. An electrodynamic linear motor comprising a primary part having a yoke with lateral parts, a plurality of direct current excitation windings mounted on said primary part, a multiphase AC winding mounted on the primary part for producing a travelling field, a secondary part having a plurality of alternating magnetic and non-magnetic sectors whose lengths correspond to a pole division of the multiphase AC winding, said primary part comprising stacks of laminations subdivided in height into a plurality of component sections which are surrounded by said respective direct current excitation windings, the magnetic flux path of the direct current excitation being closed only through said lateral parts of said yoke of the primary part.

2. An electrodynamic linear motor as claimed in claim 1, wherein the magnetic sectors of the secondary part of the motor are subdivided in height into component sections corresponding to the stacks of laminations, and the component sections are mutually displaced by one pole division of the AC winding.

3. An electrodynamic linear motor as claimed in claim 1, wherein the AC winding has a plurality of conductors arranged in individual stacks of laminations displaced by a pole division of the AC winding.

4. An electrodynamic linear motor as claimed in claim 1, comprising a plurality of component synchronous electrodynamic linear motors positioned adjacent each other and having their primary parts joined by a common yoke.

5. An electrodynamic linear motor as claimed in claim 2, further comprising non-magnetic material interconnecting several component sections of the magnetic sectors of the secondary part.

* * * * *